US011297432B2

(12) United States Patent
Kawai

(10) Patent No.: US 11,297,432 B2
(45) **Date of Patent: *Apr. 5, 2022**

(54) AUDIO SIGNAL PROCESSING METHOD

(71) Applicant: Yamaha Corporation, Hamamatsu (JP)

(72) Inventor: Hironari Kawai, Hamamatsu (JP)

(73) Assignee: Yamaha Corporation, Hamamatsu (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/224,214

(22) Filed: Apr. 7, 2021

(65) Prior Publication Data

US 2021/0227325 A1 Jul. 22, 2021

Related U.S. Application Data

(63) Continuation of application No. 16/528,953, filed on Aug. 1, 2019, now Pat. No. 11,006,217.

(30) Foreign Application Priority Data

Aug. 2, 2018 (JP) ............................ JP2018-145727

(51) Int. Cl.

| | |
|---|---|
| ***H04B 3/00*** | (2006.01) |
| ***H04R 3/12*** | (2006.01) |
| *H04R 27/00* | (2006.01) |
| *H04R 3/04* | (2006.01) |

(52) U.S. Cl.
CPC *H04R 3/12* (2013.01); *H04R 3/04* (2013.01)

(58) Field of Classification Search
CPC .................................... H04R 3/12; H04R 3/04
USPC ............................................................ 381/77
See application file for complete search history.

(56) References Cited

U.S. PATENT DOCUMENTS

| | | | | |
|---|---|---|---|---|
| 11,006,217 | B2 * | 5/2021 | Kawai | H04R 3/12 |
| 2011/0058689 | A1 * | 3/2011 | Sugiura | G06F 3/165<br>381/104 |
| 2015/0045922 | A1 | 2/2015 | Beckhardt et al. | |

FOREIGN PATENT DOCUMENTS

| | | |
|---|---|---|
| JP | 2015-527768 A | 9/2015 |

* cited by examiner

*Primary Examiner* — Ammar T Hamid
(74) *Attorney, Agent, or Firm* — Crowell & Moring LLP

(57) ABSTRACT

An audio signal processing method of an audio signal distribution device including a receiver, a determiner, and a transmitter. The receiver receives information relating to capabilities of a distribution destination device to which an audio signal is distributed. The determiner, based on the capabilities of the distribution destination device in received information, determines a role of processing of the audio signal of each device including an own device and the distribution destination device and generates processing information according to the processing of the audio signal. The transmitter distributes the processing information and the audio signal to the distribution destination device.

7 Claims, 17 Drawing Sheets

Fig.5

| | | | |
|---|---|---|---|
| MODEL INFORMATION | DSP CAPABILITIES | REPRODUCIBLE FREQUENCY | EFFICIENCY |

Fig.6

| IDENTIFICATION INFORMATION | MODEL INFORMATION | DSP CAPABILITIES | REPRODUCIBLE FREQUENCY | EFFICIENCY |
|---|---|---|---|---|
| 000010 | SP-1 | 2500 | 200Hz～20kHz | 80dB |
| 001001 | SW-1 | 2500 | 50Hz～400Hz | 90dB |

Fig.7

| REPRODUCTION OBJECT | PROCESSING CONTENT | PARAMETER | PROCESSING CONTENT | PARAMETER |
|---|---|---|---|---|
| LFE | GAIN ADJUSTMENT | -10dB | LOW-PASS FILTER | CUTOFF 300Hz |

Fig.8

| REPRODUCTION OBJECT | PROCESSING CONTENT | PARAMETER |
|---|---|---|
| MAIN | HIGH-PASS FILTER | CUTOFF 300Hz |

Fig.9

| IDENTIFICATION INFORMATION | MODEL INFORMATION | DSP CAPABILITIES | REPRODUCIBLE FREQUENCY | EFFICIENCY |
|---|---|---|---|---|
| 000020 | SP-2 | 5000 | 100Hz～20kHz | 80dB |
| 001001 | SW-1 | 2500 | 50Hz～400Hz | 90dB |

Fig.12

| IDENTIFICATION INFORMATION | MODEL INFORMATION | DSP CAPABILITIES | REPRODUCIBLE FREQUENCY | EFFICIENCY |
|---|---|---|---|---|
| 000010 | SP-1 | 2500 | 200Hz～20kHz | 80dB |
| 001001 | SW-1 | 2500 | 50Hz～400Hz | 90dB |
| 003001 | SP-3 | 2000 | 500Hz～20kHz | 70dB |
| 003002 | SP-3 | 2000 | 500Hz～20kHz | 70dB |

Fig.15

| IDENTIFICATION INFORMATION | MODEL INFORMATION | DSP CAPABILITIES | REPRODUCIBLE FREQUENCY | EFFICIENCY | GAIN ADJUSTMENT |
|---|---|---|---|---|---|
| 000010 | SP-1 | 2500 | 200Hz～20kHz | 80dB | - |
| 001003 | SW-3 | 2500 | 50Hz～400Hz | 90dB | +6dB |

AUDIO SIGNAL PROCESSING METHOD

CROSS REFERENCE TO RELATED APPLICATIONS

This application is a continuation of U.S. patent application Ser. No. 16/528,953, filed Aug. 1, 2019, which claims priority under 35 U.S.C. § 119 from Japanese Patent Application No. 2018-145727 filed Aug. 2, 2018, the entire contents of which are hereby incorporated by reference.

BACKGROUND OF THE INVENTION

1. Field of the Invention

A preferred embodiment of the present invention relates to an audio signal distribution device that distributes an audio signal, an audio signal reception device that receives an audio signal, an audio signal processing system including the audio signal distribution device and the audio signal reception device, and an audio signal processing method.

2. Description of the Related Art

National Publication of International Patent Application No. 2015-527768 discloses a system including a controller and an audio playback device that is paired with the controller. The controller receives status information from each audio playback device with which the controller is paired, and detects a failure of the audio playback device. The controller, when detecting a failure of the audio playback device, reconfigures system parameters.

The controller disclosed in National Publication of International Patent Application No. 2015-527768 calculates a parameter according to signal processing of all audio playback devices in the system. Therefore, the controller needs high arithmetic capacity.

SUMMARY

In view of the foregoing, a preferred embodiment of the present invention provides an audio signal distribution device, an audio signal reception device, an audio signal processing system, and an audio signal processing method that are able to calculate a parameter according to signal processing of each device in a system, without depending on arithmetic capacity of one device.

An audio signal distribution device according to a preferred embodiment of the present invention includes a receiver that receives information relating to capabilities of a distribution destination device to which an audio signal is distributed, a determiner that, based on the capabilities of the distribution destination device in received information, determines a role of processing of the audio signal of each device including an own device and the distribution destination device and generates processing information according to the processing of the audio signal, and a transmitter that distributes the processing information and the audio signal to the distribution destination device.

According to a preferred embodiment of the present invention, a parameter according to signal processing of each device in a system is able to be calculated without depending on arithmetic capacity of one device.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 shows an example of capability information.

FIG. 6 shows a specific example of capability information.

FIG. 7 shows an example of processing information.

FIG. 8 shows an example of processing information.

FIG. 9 shows an example of capability information.

FIG. 12 shows an example of capability information.

FIG. 15 shows an example of capability information and adjustment information.

DETAILED DESCRIPTION OF THE PREFERRED EMBODIMENTS

Figure 1:
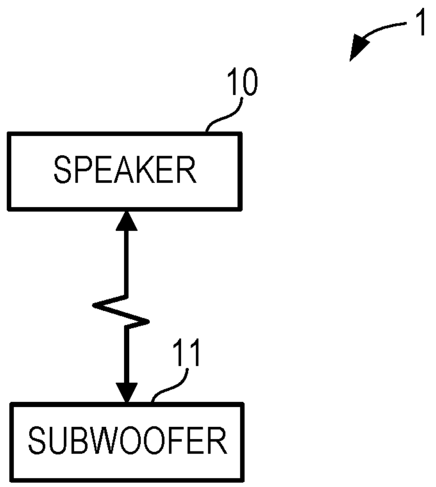
FIG. 1 is a block diagram showing a configuration of an audio signal processing system.
Figure 2:
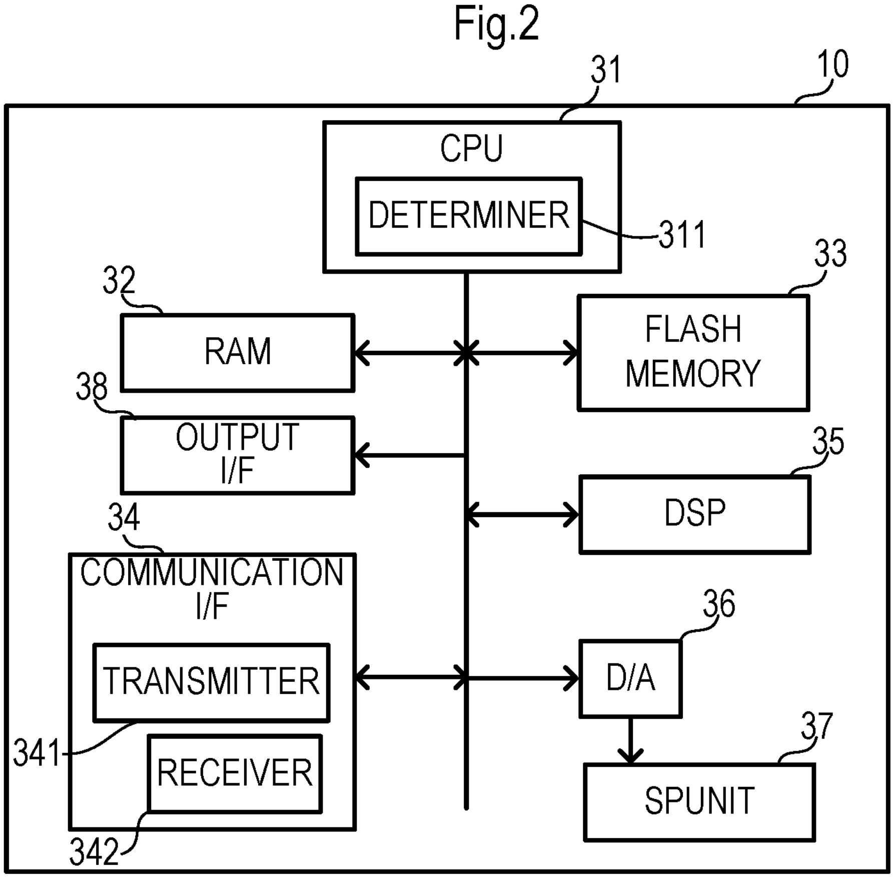
FIG. 2 is a block diagram showing a configuration of a speaker.
Figure 3:
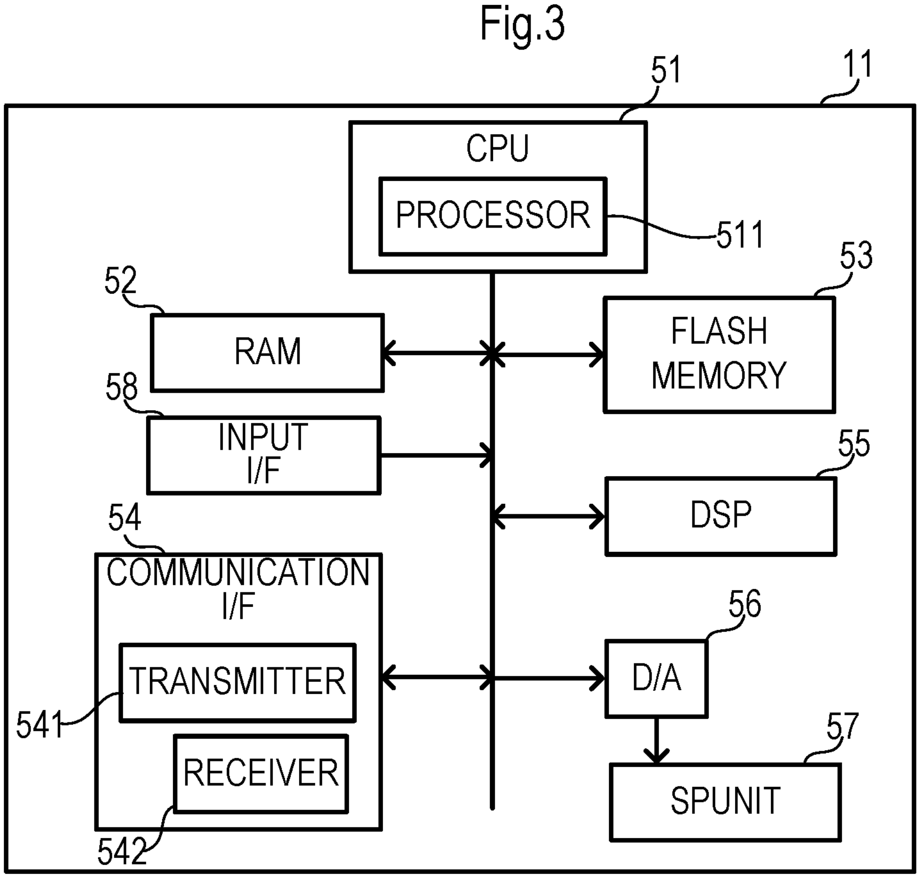
FIG. 3 is a block diagram showing a configuration of a subwoofer.

FIG. 1 is a block diagram showing a configuration of an audio signal processing system 1 according to a preferred embodiment of the present invention. FIG. 2 is a block diagram showing a configuration of a speaker 10. FIG. 3 is a block diagram showing a configuration of a subwoofer 11.

As shown in FIG. 1, the audio signal processing system 1 includes a speaker 10 and a subwoofer 11. The speaker 10 is an example of an audio signal distribution device that distributes an audio signal. However, the audio signal distribution device is not limited to a speaker. For example, the example of the audio signal distribution device includes a receiver, a player, a smartphone, or a personal computer.

The subwoofer 11 is an example of an audio signal reception device or a distribution destination device that receives an audio signal. However, the audio signal reception device or the distribution destination device is not limited to a subwoofer. The example of the audio signal reception device or the distribution destination device also includes a speaker other than the subwoofer.

As shown in FIG. 2, the speaker 10 includes a CPU 31, a RAM 32, a flash memory 33, a communication interface (I/F) 34, a DSP (Digital Signal Processor) 35, a D/A converter 36, a speaker (SP) unit 37, and an output interface (I/F) 38.

The communication I/F 34 may be a wireless communication portion that conforms to the Wi-Fi (registered trademark) standard, for example. The communication I/F 34 communicates with other devices through a not-shown router with a wireless access point. Accordingly, the communication I/F 34 performs the function of a transmitter 341 and a receiver 342. However, in the present invention, communication is not limited to wireless communication.

The flash memory 33 is a storage medium. The flash memory 33 stores a program for operation of the CPU 31, for example. The CPU 31 performs various types of processing by reading the program stored in the flash memory 33 to the RAM 32, and executing the program. For example, the CPU 31 inputs an audio signal to the DSP 35 and causes the DSP 35 to perform various types of signal processing. Accordingly, the CPU 31 and the DSP 35 function as a signal processing portion. It is to be noted that, processing of an audio signal may be performed by software in the CPU 31.

Content data according to an audio signal is received, for example, from another device such as a receiver, a player, a smartphone, a personal computer, or an external server. The CPU 31 receives content data through the receiver 342 of the communication I/F 34. The CPU 31 decodes the received content data by the DSP 35, and takes out an audio signal. The audio signal may be a monaural signal, a stereo signal, or a multichannel signal. The CPU 31, in the DSP 35, performs various types of signal processing such as level adjustment processing or filter processing on the audio signal that has been taken out. The CPU 31 inputs the audio signal that has been processed by the DSP 35, to the D/A converter 36. The D/A converter 36 converts an inputted digital audio signal into an analog audio signal. The SP unit 37 outputs sound based on the analog audio signal that has been converted by the D/A converter 36.

The CPU 31 achieves a determiner 311 of the present invention by the program. The function of the determiner 311 will be described in detail later. The determiner 311 receives information relating to capabilities from other devices including the subwoofer 11, through the receiver 342. The determiner 311 compares the capabilities of an own device with the capabilities of other devices. The determiner 311 determines a role of processing of an audio signal of each device including the own device and the other devices. The determiner 311 generates processing information according to the processing of the audio signal. The CPU 31 transmits the processing information to the other devices through the transmitter 341. In addition, the CPU 31 distributes the audio signal that has been taken out in the DSP 35, to the other devices through the transmitter 341.

FIG. 3 is a block diagram showing a configuration of the subwoofer 11. The subwoofer 11 includes a CPU (Central Processing Unit) 51, a RAM 52, a flash memory 53, a communication interface (I/F) 54, a DSP 55, a D/A converter 56, a speaker (SP) unit 57, and an input interface (I/F) 58.

The communication I/F 54 may be a wireless communication portion that conforms to the Wi-Fi (registered trademark) standard, for example. The communication I/F 54 communicates with other devices through a not-shown router with a wireless access point. Accordingly, the communication I/F 54 performs the function of a transmitter 541 and a receiver 542. However, in the present invention, communication is not limited to wireless communication.

The flash memory 53 is a storage medium. The flash memory 53 stores a program for operation of the CPU 51. The CPU 51 performs various types of processing by reading the program stored in the flash memory 53 to the RAM 52, and executing the program. The CPU 51 achieves a processor 511 of the present invention together with the DSP 55 by executing the program. It is to be noted that, in the present invention, the DSP 55 is dispensable. The processing of the audio signal may be performed by software in the CPU 51.

The processor 511 receives the processing information through the receiver 542. The processor 511 determines what types of signal processing should be performed in the own device. The processing information includes a role of each device and a parameter of signal processing. For example, the processing information includes information that a role of the subwoofer 11 includes processing a signal of the LFE channel. In addition, the processing information includes gain in level adjustment processing, and a cutoff frequency in low-pass filter processing as a signal processing parameter. Therefore, the processor 511 determines that low-pass filter processing is performed on an audio signal of the LFE channel.

The CPU 51 receives an audio signal through the receiver 542. The processor 511 calculates a filter coefficient for processing an audio signal by the DSP 55 based on the processing information. The DSP 55 processes an audio signal based on the calculated filter coefficient. The CPU 51 inputs the audio signal that has been processed by the DSP 55, to the D/A converter 56. The D/A converter 56 converts an inputted digital audio signal into an analog audio signal. The SP unit 57 outputs sound based on the analog audio signal that has been converted by the D/A converter 56. It is to be noted that distribution of an audio signal according to the present invention is not limited to the example of distributing a decoded audio signal. The distribution of an audio signal also includes an example of distributing an audio signal that has been encoded as content data. In the example described above, the speaker 10 has decoded content data, taken out an audio signal, and distributed the audio signal. However, the speaker 10 may distribute encoded content data without decoding content data. In such a case, the CPU 51 of the subwoofer 11 decodes content data using the DSP 55, and takes out an audio signal.

Figure 4:
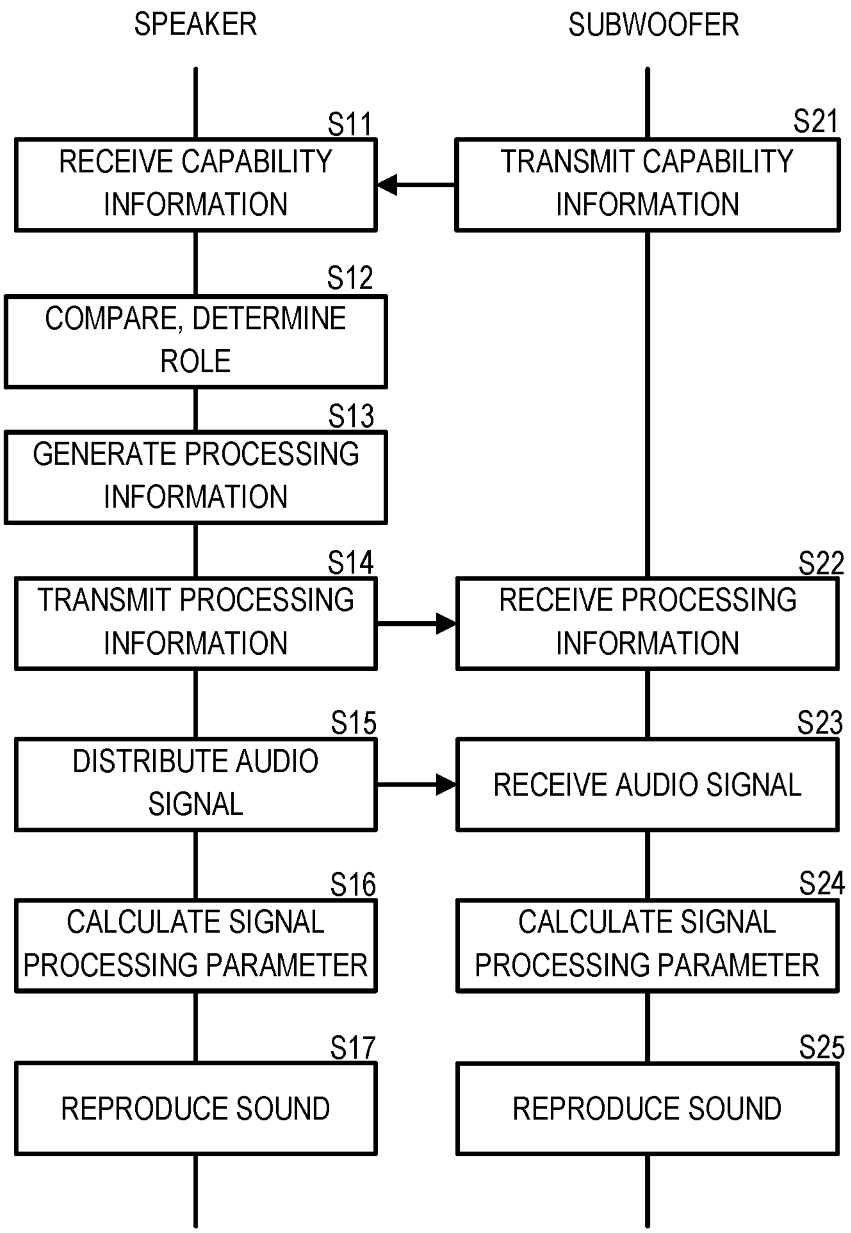
FIG. 4 is a flow chart showing an operation of the speaker and the subwoofer.

FIG. 4 is a flow chart showing an operation of the speaker 10 and the subwoofer 11. The operation shown in FIG. 4 is executed when connection between the speaker 10 and the subwoofer 11 is established, for example.

First, the transmitter 541 of the subwoofer 11 transmits information (hereinafter referred to as capability information) relating to capabilities of the own device, to the speaker 10 (S21).

FIG. 5 shows an example of capability information. The capability information includes model information, the capabilities of the DSP, a reproducible frequency of the SP unit, the efficiency of the SP unit, and any other information if needed.

The receiver 342 of the speaker 10 receives the capability information (S11). The determiner 311 of the speaker 10 compares received capability information with the capabilities of the own device, and determines a role of processing of an audio signal of each device (S12). FIG. 6 shows a specific example of capability information. The capability information includes identification information, model information, DSP capability information, a reproducible frequency, and efficiency of a device. The identification information is information specific to each device, such as a manufacturing number or a MAC address. The speaker 10 of the present preferred embodiment includes identification number 000010 and model information SP-1. The model information SW-1 corresponds to the subwoofer 11 of the present preferred embodiment.

The speaker 10 has the reproducible frequency band ranging from 200 Hz to 20 kHz. The subwoofer 11 has the reproducible frequency band ranging from 50 Hz to 400 Hz. The DSP capabilities are results (arithmetic scores) of predetermined benchmarks, for example. In this example, the speaker 10 and the subwoofer 11 have same DSP capabilities. The efficiency of the speaker 10 is 80 dB and the efficiency of the subwoofer 11 is 90 dB.

The subwoofer 11 has a lower reproducible frequency band than the speaker 10, and is able to reproduce low frequency audio of 100 Hz or less. Therefore, the speaker 10 sets the role of reproducing the audio signal of the LFE channel to the subwoofer 11 as a result of comparing the reproducible frequency band of the own device with the reproducible frequency band of the subwoofer 11. In addition, the speaker 10 sets the subwoofer 11 to perform low-pass filter processing. Furthermore, the speaker 10 sets a cutoff frequency of the low-pass filter processing. For example, the speaker 10 sets 300 Hz as an average value of the lower limit frequency 200 Hz of the speaker 10 and the upper limit frequency 400 Hz of the subwoofer 11, as the cutoff frequency. In addition, the efficiency of the subwoofer 11 is 10 dB higher than the efficiency of the speaker 10. Therefore, the speaker 10 sets the subwoofer 11 to perform a −10 dB gain adjustment.

Based on the above determination, the determiner 311 of the speaker 10 generates processing information (S13). FIG. 7 shows an example of processing information. In the example of FIG. 7, the processing information includes information indicating the role (reproduction object) of a device, information indicating processing content, and parameter information. The processing information to the subwoofer 11 includes the LFE channel, signal processing of gain adjustment, a parameter (−10 dB) of the gain adjustment, signal processing of low-pass filter processing, and a parameter (the cutoff frequency of 300 Hz) of the low-pass filter processing.

In addition, FIG. 8 shows an example of the processing information to the speaker 10 being the own device. The speaker 10 reproduces all channels except the LFE channel. The speaker 10 performs high-pass filter processing in order to reproduce bands other than the reproduction band of the subwoofer 11. The cutoff frequency is 300 Hz that is the same as the cutoff frequency of the subwoofer 11.

The transmitter 341 of the speaker 10 transmits such processing information to the subwoofer 11 (S14). The receiver 542 of the subwoofer 11 receives the processing information (S22). In addition, the transmitter 341 of the speaker 10 distributes an audio signal taken from content data (S15). In the present preferred embodiment, the audio signal is a multichannel signal, for example, a 5.1-channel signal of L, C, R, SL, SR, and LFE channels. The receiver 542 of the subwoofer 11 receives the audio signal that the speaker 10 has distributed (S23).

The speaker 10 and the subwoofer 11 perform signal processing according to each role. The speaker 10, as shown in FIG. 8, reproduces all other channels except the LFE channel. In addition, the speaker 10 performs high-pass filter processing. Therefore, the speaker 10 takes out an audio signal of L, C, R, SL, and SR channels, mixes the audio signal down to a monaural signal, and calculates a filter coefficient in order to make the signal pass a band of 300 Hz or more (S16). The subwoofer 11 performs gain adjustment and low-pass filter processing to an audio signal of the LFE channel. Therefore, the processor 511 of the subwoofer 11 takes out the audio signal of the LFE channel, performs the gain adjustment, and calculates a filter coefficient to make the audio signal pass a band of 300 Hz or less (S24).

The speaker 10 and the subwoofer 11, using calculated filter coefficients, process an audio signal, and output sound from the SP unit. The speaker 10 reproduces sound from all channels other than the LFE channel (S17). The subwoofer 11 reproduces sound of the LFE channel (S25).

As described above, the audio signal processing system 1 according to the present preferred embodiment of the present invention compares the capabilities of the subwoofer 11 with the capabilities of the speaker 10 in the speaker 10, and determines the role of each device. In addition, the speaker 10 generates processing information according to the processing of an audio signal, and transmits the processing information to the subwoofer 11. The speaker 10 and the subwoofer 11 share a calculation according to the signal processing. Therefore, the audio signal processing system 1 according to the present preferred embodiment of the present invention is able to calculate an optimal parameter according to signal processing of each device in the system without depending on arithmetic capacity of one device.

In the above preferred embodiment, the speaker 10 and the subwoofer 11 have the same DSP capabilities. However, in a case in which the audio signal distribution device has a high arithmetic capacity, for example, the audio signal distribution device may perform signal processing, and then may distribute an audio signal to the distribution destination device. For example, FIG. 9 shows an example of capability information in the case in which the audio signal distribution device has a high arithmetic capacity. In this example, the DSP capabilities of an audio signal distribution device (which is an audio signal distribution devices being a speaker according the identification information 000020 and the model information SP-2 in FIG. 9) are significantly higher than the DSP capabilities of the subwoofer 11 (the arithmetic scores are more than twice, for example). In such a case, the speaker being the audio signal distribution device, after performing low-pass filter processing with a high processing load on an audio signal of the LFE channel, transmits the audio signal to the subwoofer 11.

Even in such a case, the speaker 10 compares the capabilities of the subwoofer 11 with the capabilities of the speaker 10, and determines the role of each device. The speaker 10 sets the role of reproducing the audio signal of the LFE channel to the subwoofer 11. In addition, the speaker 10 sets the own device to perform low-pass filter processing with a high processing load. The speaker 10 sets the subwoofer 11 to perform gain adjustment with a low processing load.

In addition, the speaker SP-2 shown in FIG. 9 has a wider reproducible frequency band than speaker SP1 shown in FIG. 6. Therefore, the speaker 10 sets the cutoff frequency to 250 Hz instead of 300 Hz. The speaker 10 then takes out the audio signal of the LFE channel, and calculates a filter coefficient that makes the audio signal pass a band of 250 Hz or less. The speaker 10 performs low-pass filter processing on the audio signal of the LFE channel, and transmits the audio signal after the filter processing to the subwoofer 11. It is to be noted that, in such a case, in the flow chart of FIG. 4, the speaker 10 performs processing of distributing an audio signal, after the processing of S16.

In such a manner, the audio signal processing system 1 according to the present preferred embodiment of the present invention is able to calculate an optimal role and an optimal parameter in each device according to the capabilities of each device in the system. For example, in a case in which the DSP capabilities of the speaker 10 are much higher, the speaker 10 may transmit the audio signal to the subwoofer 11 after performing all the signal processing. In addition, the speaker 10, in a case of distributing an audio signal to a different subwoofer of which the reproducible frequency band is different from the reproducible frequency band of the subwoofer 11, sets an optimal cutoff frequency (a crossover frequency) according to the reproducible frequency of the different subwoofer 11 and the reproducible frequency band of the own device.

It is to be noted that the speaker 10 receives capability information from the subwoofer 11 being a distribution destination device, compares the capabilities of the own device with the capabilities of the distribution destination device, and determines the role of each device. However, comparison of the capabilities of the own device with the capabilities of a distribution destination device is dispensable. For example, the speaker 10 may make a determination of whether the capability information received from the distribution destination device satisfies predetermined conditions, and may determine the role of each device based on this determination. Specifically, in a case in which the capabilities of the DSP are not less than a predetermined value, the speaker 10 may make the subwoofer 11 execute all the signal processing. In addition, in a case in which a reproducible frequency band satisfies a predetermined condition (a condition of below 400 Hz, for example), the speaker 10 may make the distribution destination device process an audio signal of the LFE channel.

It is to be noted that the operation shown in FIG. 4 is performed when connection between the speaker 10 and the subwoofer 11 is established. However, the number of devices in the system may be increased or decreased. Therefore, the operation shown in FIG. 4 may be performed when the number of devices in the system is changed. In other words, when the speaker 10 is paired with a new speaker or when a paired device is removed, operation shown in FIG. 4 may be executed. Alternatively, the operation shown in FIG. 4 may be performed periodically at every predetermined time. In addition, the operation shown in FIG. 4 may be performed even when the number of devices in the system is not changed but when a speaker to be connected is changed.

In addition, the operation shown in FIG. 4 may be performed based on the characteristics of an audio signal to be distributed. For example, the speaker 10, in a case in which an audio signal included in content data is changed from a 5.1-channel signal to a 2-channel stereo signal, may cause the subwoofer 11 to transmit capability information and may redo processing from determination of a role. In addition, for example, in a case in which the lower limit of the reproducible frequency band of the speaker 10 is 100 Hz and the upper limit of the reproducible frequency band of the subwoofer 11 is 400 Hz, both speakers are able to reproduce a band from 100 Hz to 400 Hz. However, the speaker 10 has a higher reproduction capability on a high frequency side, and the subwoofer 11 has a higher reproduction capability on a low frequency side. In a case in which the type of content data to be reproduced is content with an advantage on the high frequency side, such as pop, a crossover frequency is set low. As a result, the settings are made to give an advantage to the sound of the speaker 10. In a case in which the type of content data is content with an advantage on the low frequency side, such as rock music, a crossover frequency is set high. As a result, the settings are made to give an advantage to the sound of the subwoofer 11.

The above example shows that the subwoofer 11 transmits information including DSP capabilities, a reproducible frequency, or efficiency, as capability information. However, the subwoofer 11 may transmit only model information as capability information, for example. In such a case, the speaker 10 determines the capabilities of the subwoofer 11 based on the model information. For example, the speaker 10 has a database in which model information is associated with information including DSP capabilities, a reproducible frequency band, or efficiency. The speaker 10 is able to compare capabilities by referring to the database with received model information.

Figure 10:
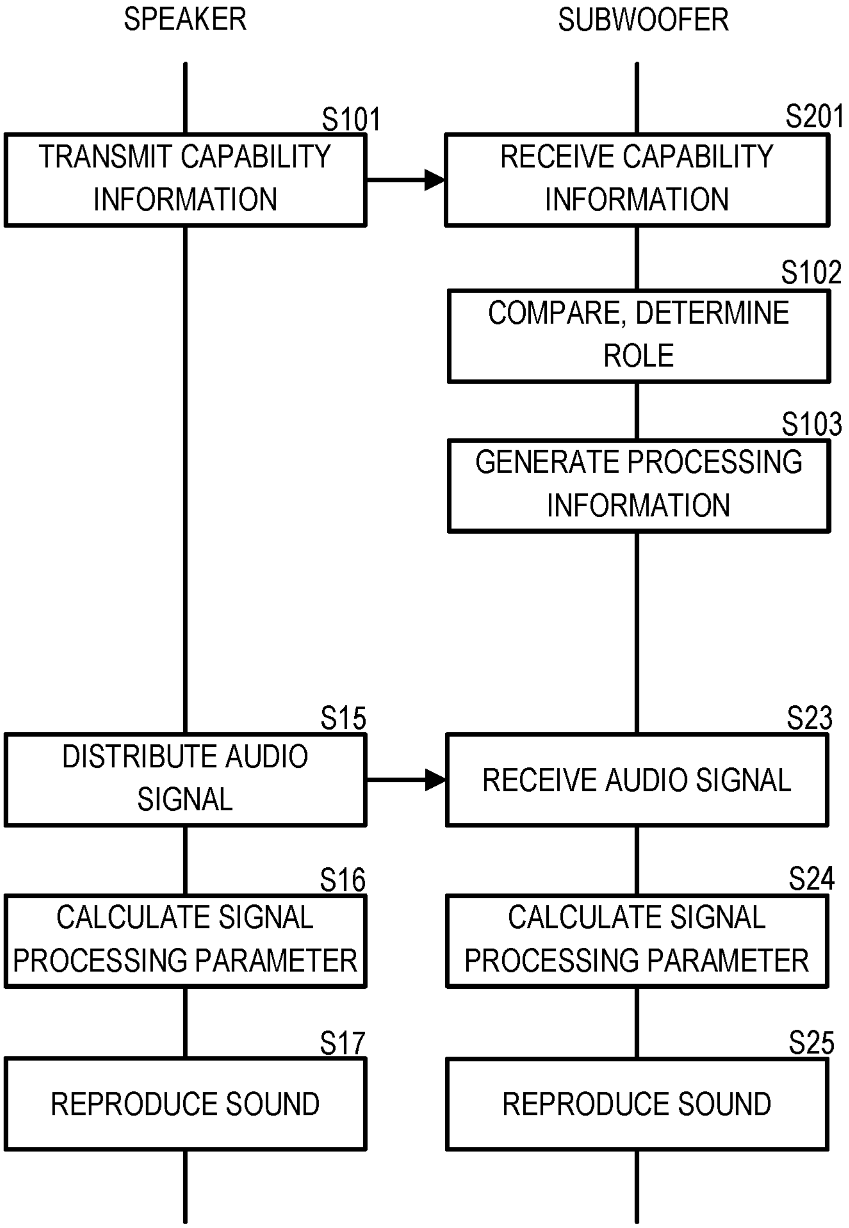
FIG. 10 is a flow chart showing an operation of the speaker and the subwoofer.

In addition, the speaker 10 may transmit capability information to the subwoofer 11, and the subwoofer 11 may compare capabilities. The subwoofer 11 may make a determination of what types of signal processing should be performed based on the capability information received from the speaker 10, and may process an audio signal based on the determination. FIG. 10 is a flow chart showing an example of comparing capabilities in the subwoofer 11. Like reference numerals are used to refer to processing common to the processing in FIG. 4, and the description is omitted.

The speaker 10 transmits capability information to the subwoofer 11 (S101). The capability information is information including DSP capabilities, a reproducible frequency, or efficiency. The capability information may be only model information. The subwoofer 11, only by the model information, refers to the database in which model information is associated with information according to respective capabilities and is able to determine capabilities of the speaker 10.

The subwoofer 11 receives capability information (S201). The subwoofer 11, based on received capability information, compares the capabilities of the own device with the capabilities of the speaker 10, and determines the role of the own device (S102). As shown in FIG. 6, the subwoofer 11 has a lower reproducible frequency band than the speaker 10, and is able to reproduce low frequency audio of 100 Hz or less. Therefore, the subwoofer 11 compares the reproducible frequency band of the own device with the reproducible frequency band of the speaker 10. The subwoofer 11, as a result of comparison, sets a role of reproducing an audio signal of the LFE channel in the own device. In addition, the subwoofer 11 makes settings to perform low-pass filter processing. Furthermore, the subwoofer 11 sets a cutoff frequency of the low-pass filter processing. In addition, the subwoofer 11, since having efficiency that is 10 dB higher than the efficiency of the speaker 10, makes settings to perform the −10 dB gain adjustment.

The subwoofer 11 generates processing information based on the above settings (S103). The processing information includes information of performing gain adjustment and low-pass filter processing on an audio signal of the LFE channel. In addition, the processing information also includes parameter information of the gain adjustment and the low-pass filter processing. The subwoofer 11 receives an audio signal in S23, takes out an audio signal of the LFE channel in S24, performs the gain adjustment, and calculates a filter coefficient that makes the audio signal pass a band of 300 Hz or less.

It is to be noted that the operation of FIG. 4 and the operation of FIG. 10 may be combined. In other words, the speaker 10 and the subwoofer 11 mutually transmit and receive the capability information of the own device. The speaker 10 and the subwoofer 11 compare the capabilities of the own device with the capabilities of the counterpart, respectively, and determine the role of the own device.

In the above preferred embodiment, an audio signal is transmitted and received through the network. However, the speaker 10 includes the output I/F 38 and the subwoofer 11 includes the input I/F 58. Therefore, an audio signal may be transmitted and received through the output I/F 38 and the input I/F 58.

The output I/F 38 and the input I/F 58 may be an analog audio terminal or a digital audio terminal. Since an audio signal is transmitted and received through the output I/F 38 and the input I/F 58, transmission and reception of the audio signal is performed stably without depending on a communication environment. Even in such a case, the capability information and the processing information are transmitted and received through a network. Therefore, even in a case in which an audio signal is transmitted and received through an analog audio terminal or a digital audio terminal, the optimal role and the optimal parameter are set according to the capabilities of each device.

Figure 11:
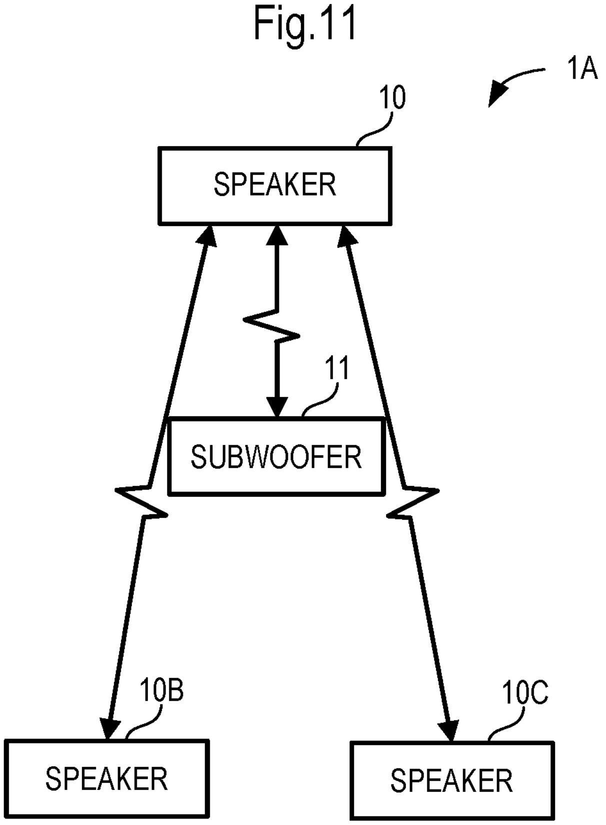
FIG. 11 is a block diagram showing a configuration of an audio signal processing system 1A including a plurality of distribution destination devices.

Subsequently, FIG. 11 is a block diagram showing a configuration of an audio signal processing system 1A including a plurality of distribution destination devices. Like reference numerals are used to refer to components common to FIG. 1, and the description is omitted.

The audio signal processing system 1A further includes a speaker 10B and a speaker 10C. The speaker 10B and the speaker 10C are examples of a distribution destination device or an audio signal reception device. The speaker 10B and the speaker 10C include a hardware configuration similar to the hardware configuration of the speaker 10.

However, as shown in FIG. 12, the speaker 10B and the speaker 10C have DSP capabilities, a reproducible frequency, and efficiency that are different from the speaker 10. The speaker 10B and the speaker 10C each correspond to the model information SP-3.

The speaker 10B and the speaker 10C have the reproducible frequency band ranging from 500 Hz to 20 kHz. The efficiency of the speaker 10B and the speaker 10C is 70 dB.

The speaker 10B and the speaker 10C have a narrower reproducible frequency band and a lower efficiency than the speaker 10. Then, the speaker 10 makes a comparison of the reproducible frequency band among the own device, the speaker 10B, the speaker 10C, and the subwoofer 11. The speaker 10, as a result of the comparison, sets the role of reproducing an audio signal of a surround channel to the speaker 10B and the speaker 10C. In addition, the efficiency of the speaker 10B and the speaker 10C is 10 dB lower than the efficiency of the speaker 10. Therefore, the speaker 10 makes settings to perform a +10 dB gain adjustment in the speaker 10B and the speaker 10C.

The speaker 10 being an audio signal distribution device determines the role of each device by integrally considering the capabilities of each of a plurality of distribution destination devices. For example, the DSP capabilities of the speaker 10B and the speaker 10C are slightly lower than the DSP capabilities of the speaker 10. However, when the speaker 10 performs the signal processing of the speaker 10B and the speaker 10C, the load of the signal processing concentrates on the speaker 10. Therefore, the speaker 10 sets the speaker 10B and the speaker 10C that have the same or substantially the same DSP capabilities to perform gain adjustment in each device.

It is to be noted that the speaker 10 may make settings to perform the −10 dB gain adjustment in the speaker 10, based on a speaker of the lowest efficiency in the system. The speaker 10 may make settings to perform a −20 dB gain adjustment in the subwoofer 11.

Figure 13:
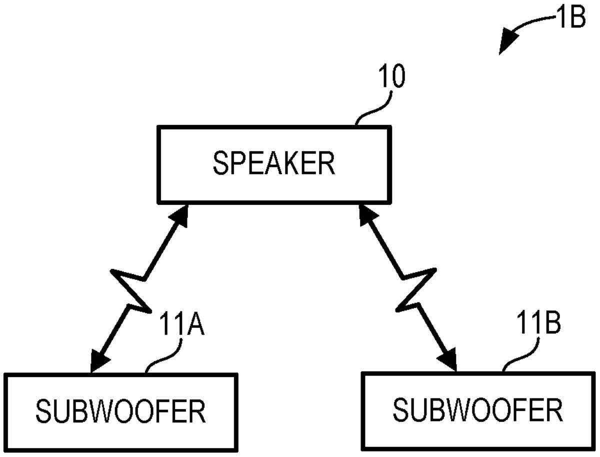
FIG. 13 is a block diagram showing a configuration of an audio signal processing system 1B including a plurality of subwoofers 11A and subwoofers 11B.

Subsequently, FIG. 13 is a block diagram showing a configuration of an audio signal processing system 1B including a plurality of subwoofers 11A and 11B. Like reference numerals are used to refer to components common to FIG. 1, and the description is omitted.

The subwoofer 11A and the subwoofer 11B are examples of a distribution destination device or an audio signal reception device. The subwoofer 11A and the subwoofer 11B have the same hardware configuration as the hardware configuration of the subwoofer 11.

In such a case, the speaker 10 sets the role of reproducing an audio signal of the same LFE channel to each of the subwoofer 11A and the subwoofer 11B. In addition, the speaker 10 sets the subwoofer 11A and the subwoofer 11B to perform low-pass filter processing.

Even in this case, the speaker 10 being an audio signal distribution device determines the role of each device by integrally considering the capabilities of each of a plurality of distribution destination devices. In the example of FIG. 13, sound of the same LFE channel is outputted from the two subwoofers. Therefore, the speaker 10 further sets a greater amount of attenuation in addition to the gain adjustment according to correction of the efficiency in the subwoofer 11A and the subwoofer 11B in consideration of the sound volume of the whole system. For example, the speaker 10 further adds a gain of −6 dB to each of the subwoofer 11A and the subwoofer 11B. Accordingly, even when the number of subwoofers is two or even when the number of subwoofers is one, the sound volume of the whole system does not change.

Figure 14:
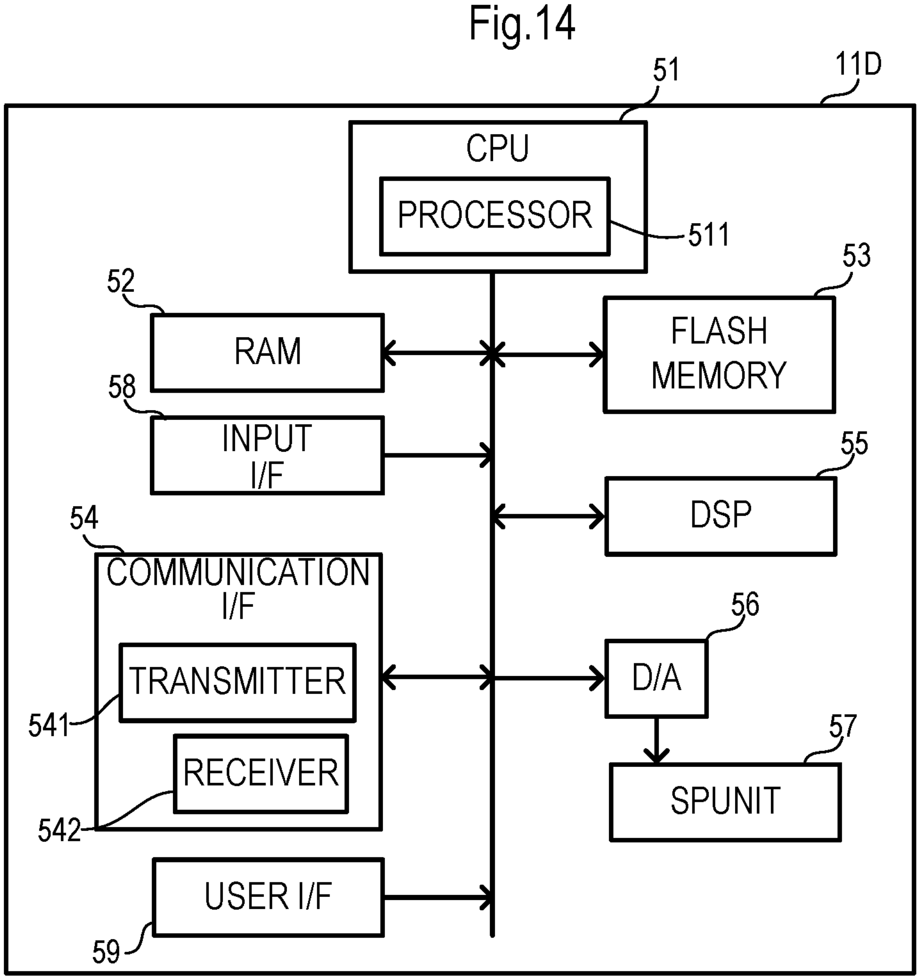
FIG. 14 is a block diagram showing a configuration of a subwoofer 11D according to a modification.

Subsequently, FIG. 14 is a block diagram showing a configuration of a subwoofer 11D according to a modification. Like reference numerals are used to refer to components common to FIG. 3, and the description is omitted.

The subwoofer 11D further includes a user interface (I/F) 59. The user I/F 59 includes a knob, a switch, or a touch panel, for example. The user can perform adjustment relating to an audio signal through the user I/F 59. For example, the user can set the gain of the subwoofer 11D higher than usual.

In such a case, the subwoofer 11D, in addition to capability information, transmits information (hereinafter referred to as adjustment information) relating to the gain adjustment received by the user I/F 59, to the speaker 10. FIG. 15 shows an example of capability information and adjustment information. In FIG. 15, the identification information of the subwoofer 11D is 001003, the model information is SW-3, and other capability information is the same or substantially the same as the capability information of the subwoofer 11 shown in FIG. 6.

In the example of FIG. 15, the subwoofer 11D, since receiving a +6 dB gain adjustment, transmits information indicating the +6 dB gain adjustment to the speaker 10 as adjustment information.

The speaker 10 determines the role of processing of an audio signal of each device based on the capability information and the adjustment information. In the example, the subwoofer 11D performs the +6 dB gain adjustment. Therefore, the speaker 10 makes settings to perform the +6 dB gain adjustment in the own device. Accordingly, even when the user manually adjusts the gain of the subwoofer 11D, the role of each device in the system is set and the optimal parameter settings are made automatically.

It is to be noted that the capability information and the adjustment information are preferably shared in all the devices in the system. The speaker 10 stores the capability information and the adjustment information in the flash memory 33 being a storage. The speaker 10, when canceling the pairing with the subwoofer 11D and then establishing again the pairing with the subwoofer 11D, determines the role of each device by reading the capability information and the adjustment information from the flash memory 33. Therefore, the parameter settings based on the content that the user has already adjusted manually are reproduced only by pairing after the role of each device is determined.

Figure 16:
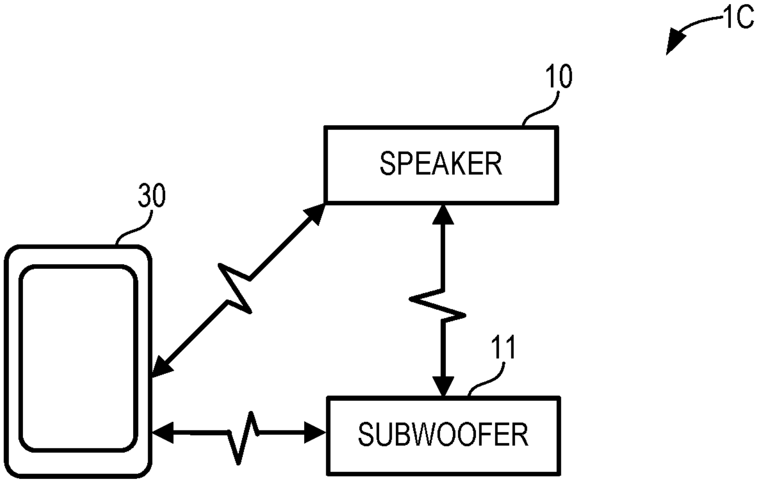
FIG. 16 is a block diagram showing a configuration of an audio signal processing system 1C including a controller 30.

Subsequently, FIG. 16 is a block diagram showing a configuration of an audio signal processing system 1C including a controller 30. The audio signal processing system 1C is different from the audio signal processing system 1 shown in FIG. 1 in that the controller 30 is provided. The controller 30 may be an information processor such as a smartphone or a tablet terminal.

The controller 30 communicates with the speaker 10 and the subwoofer 11 through a not-shown router with a wireless access point. The controller 30 is able to instruct adjustment relating to an audio signal, to the speaker 10 or the subwoofer 11. For example, as with the example shown in FIG. 14 and FIG. 15, the user, through the controller 30, can set the gain of the subwoofer 11 higher than usual.

Even in such a case, the subwoofer 11, in addition to capability information, transmits content (adjustment information) of the gain adjustment instructed from the controller 30, to the speaker 10. Alternatively, the controller 30 transmits adjustment information to the speaker 10.

Therefore, as with the example shown in FIG. 14 and FIG. 15, the speaker 10 determines the role of processing of an audio signal of each device based on the capability information and the adjustment information.

It is to be noted that the subwoofer 11 may include a user I/F such as a knob and further include a movable portion such as a motor to move the knob. In such a case, the subwoofer 11, according to the content of the gain adjustment instructed by the controller 30, may change the position of the knob to a position corresponding to a gain value after the gain adjustment.

Figure 17:
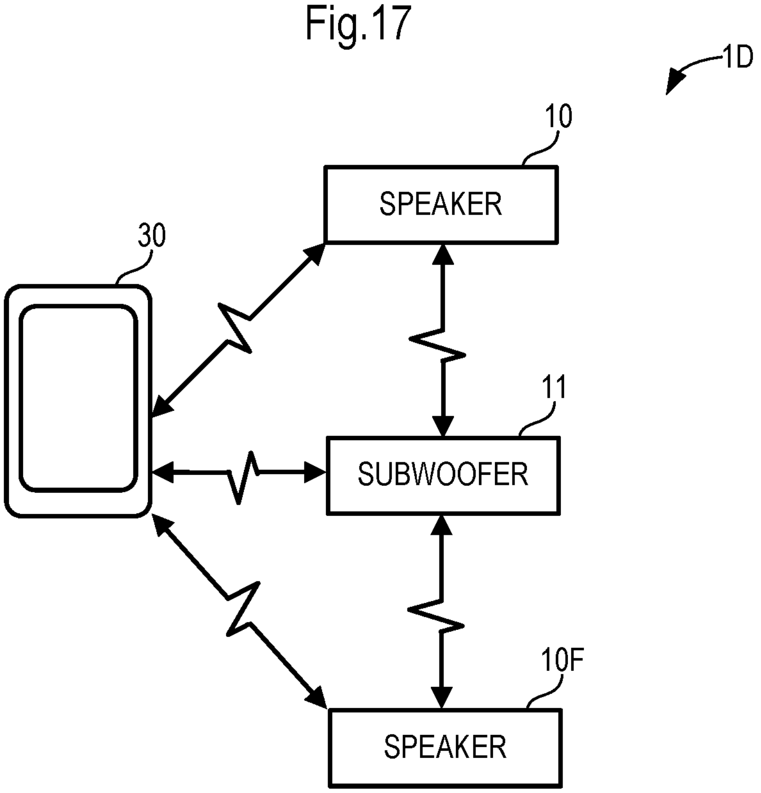
FIG. 17 is a block diagram showing a configuration of an audio signal processing system 1D.

FIG. 17 is a block diagram showing a configuration of the audio signal processing system 1D in a case in which two or more audio signal distribution devices are present and a pairing partner of the subwoofer 11 is changed. In addition to the configuration of FIG. 16, the audio signal processing system 1D includes a speaker 10F. The hardware configuration of the speaker 10F is the same or substantially the same as the hardware configuration of the speaker 10. The controller 30 is also connected to the speaker 10F.

The subwoofer 11 is paired with the speaker 10 or the speaker 10F. The user can operate the controller 30 and can change the pairing partner of the subwoofer 11.

The speakers 10F is a speaker according to the identification information 000020 and the model information SP-2 that are shown in FIG. 9, for example. The DSP capabilities of the speaker 10F are significantly higher than the DSP capabilities of the subwoofer 11 (the arithmetic scores are more than twice, for example). Therefore, in a case in which the subwoofer 11 is paired with the speaker 10F, the speaker 10F transmits an audio signal to the subwoofer 11, after performing low-pass filter processing with a high processing load. In addition, the speaker 10F has a wider reproducible frequency band than the speaker 10, and is able to reproduce sound up to about 100 Hz. Therefore, when the subwoofer 11 is paired with the speaker 10F, the speaker 10F sets the cutoff frequency to 250 Hz. The speaker 10F takes out an audio signal of the LFE channel from content data, and calculates a filter coefficient that makes the audio signal pass a band of 250 Hz or less.

On the other hand, in a case in which the subwoofer 11 paired with the speaker 10, the low-pass filter processing is performed in the subwoofer 11. In addition, when the subwoofer 11 is paired with the speaker 10, the cutoff frequency is set to 300 Hz. The subwoofer 11 takes out an audio signal of the LFE channel from audio signals transmitted from the speaker 10, and calculates a filter coefficient that makes the audio signal pass a band of 300 Hz or less.

In this manner, the audio signal processing system 1D, only by changing the audio signal distribution device being a pairing partner, automatically makes optimal parameter settings.

Finally, the foregoing preferred embodiments are illustrative in all points and should not be construed to limit the present invention. The scope of the present invention is defined not by the foregoing exemplary embodiment but by the following claims. Further, the scope of the present invention is intended to include all modifications within the scopes of the claims and within the meanings and scopes of equivalents.

What is claimed is:

1. An audio signal distribution method comprising:

receiving information relating to capabilities of a distribution destination device to which an audio signal is distributed;

determining, based on the capabilities of the distribution destination device in received information, a role of processing of the audio signal of each device including an own device and the distribution destination device and generates processing information according to the processing of the audio signal; and distributing the processing information and the audio signal to the distribution destination device, wherein:

the determining makes a comparison of capabilities between the own device and the distribution destination device when making a determination of the role of processing of the audio signal of each device; and the determining makes the comparison and the determination in a case in which a change is made in the distribution destination device.

2. The audio signal distribution method according to claim 1, further comprising:

processing the audio signal based on the processing information, wherein the distributing distributes the audio signal on which signal processing has been performed by the signal processing portion.

3. The audio signal distribution method according to claim 1, wherein the determining makes the determination based on characteristics of the audio signal to be distributed.

4. The audio signal distribution method according to claim 1, wherein the distribution destination device includes a plurality of distribution destination devices; and the determining makes the determination by integrally considering capabilities of the plurality of distribution destination devices.

5. The audio signal distribution method according to claim 1, wherein the receiving further includes receiving information relating to adjustment of an audio signal received from a user in the distribution destination device; and the determining makes the determination based on the information relating to the capabilities and the information relating to the adjustment of the audio signal.

6. The audio signal distribution method according to claim 5, further comprising:

storing the information in a storage relating to the capabilities and the information relating to the adjustment of the audio signal, wherein the determining makes the determination based on the information relating to the capabilities and the information relating to the adjustment of the audio signal, both the information being stored in the storage.

7. The audio signal distribution method according to claim 1, wherein the audio signal distribution device is a speaker.

* * * * *